No. 852,237. PATENTED APR. 30, 1907.
C. NIELSEN.
FASTENING OF HOSE PIPES TO PIPE ENDS.
APPLICATION FILED OCT. 5, 1905.
2 SHEETS—SHEET 1.
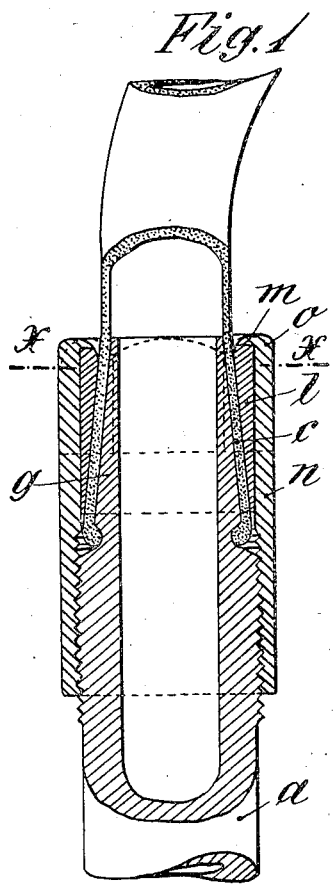
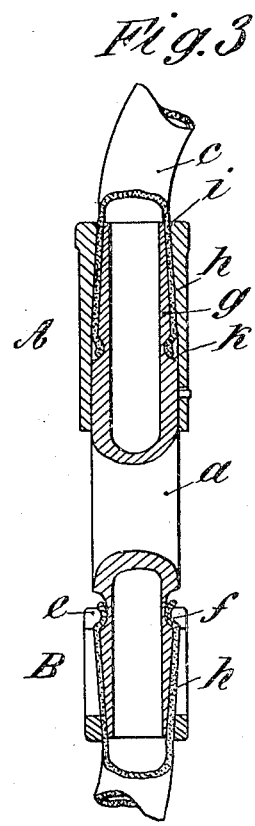
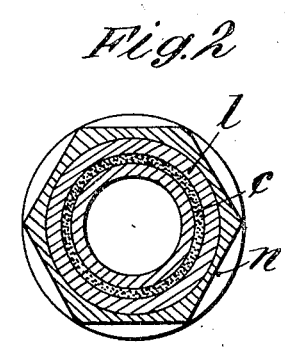
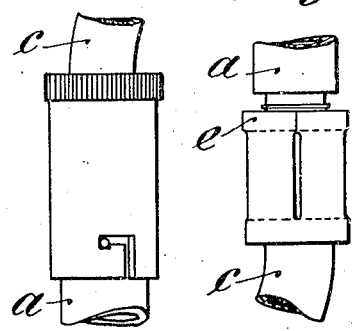
Witnesses:—
Inventor:—
Carl Nielsen
by H. B. Wilson
Attorney No. 852,237. PATENTED APR. 30, 1907.
C. NIELSEN.
FASTENING OF HOSE PIPES TO PIPE ENDS.
APPLICATION FILED OCT. 5, 1905.
2 SHEETS—SHEET 2.
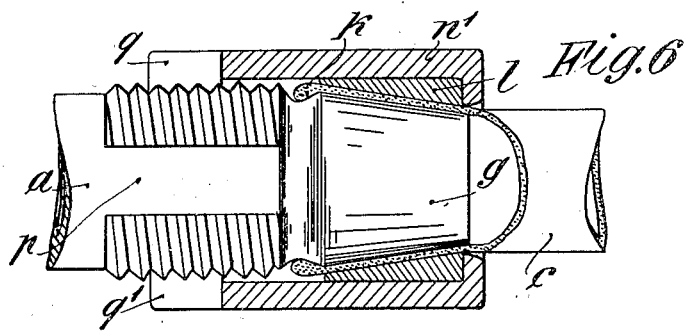
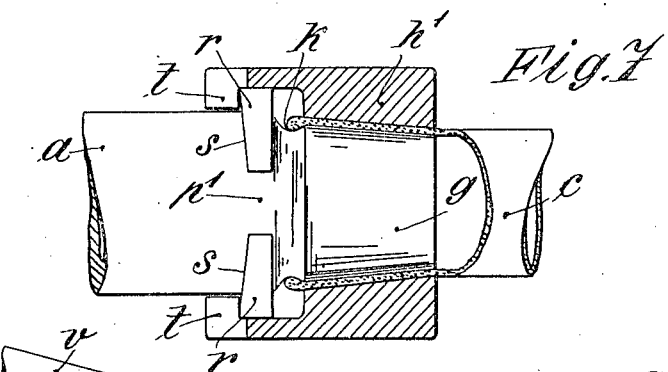
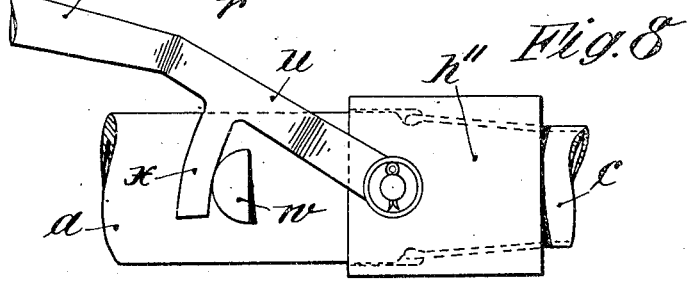
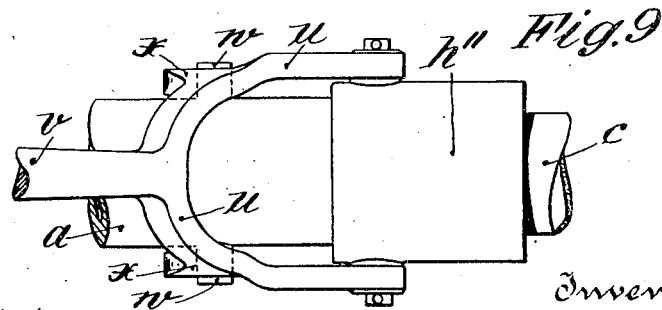

UNITED STATES PATENT OFFICE.

CARL NIELSEN, OF COPENHAGEN, DENMARK.

FASTENING OF HOSE-PIPES TO PIPE ENDS.

No. 852,237. Specification of Letters Patent. Patented April 30, 1907.

Application filed October 5, 1905. Serial No. 281,480.

*To all whom it may concern:*

Be it known that I, CARL NIELSEN, manufacturer, a citizen of Denmark, a subject of the King of Denmark, residing at Copenhagen, Oerstedsvej 20, in the Kingdom of Denmark, have invented certain new and useful Improvements in and Connected with the Fastening of Hose-Pipes to Pipe Ends, of which the following is a full, clear, and exact description.

This invention has reference to the mode of and appliances for fastening hose pipes to pipe ends; and in accomplishing the object and purpose of the invention, the elasticity of the india-rubber, of which the hose is made, is adapted and utilized to produce a good attachment between the hose and pipe ends, and one that will resist great pressure, and make a perfect joint.

The attachment of the hose pipe to a pipe end is effected by pushing the end of the hose over the pipe end, which is cone-shaped, in the usual manner,—so that the longitudinal pressure toward the increasing diameter of the conical portion of the pipe end, will tend to heap up or thicken the hose immediately in front of the sleeve. This thickening of the after part of the hose end, which serves for securing same, prevents the hose end from receding into the space between the outer surface of the pipe end and the inner surface of the sleeve, and thereby renders considerably more difficult, the tearing-off of the hose from the pipe end, even in the case of greatly increased pressure.

Experiments have shown that in pulling at a hose fastened in this manner, the hose itself would sooner come to pieces, than the hose end coming away from the pipe end; whereas, if that thickening is not produced, the end of the hose—in case of the latter being dragged—will slip out of the space between the cone-shaped pipe end and the correspondingly shaped sleeve, and the hose end will be pulled off the pipe end.

For receiving the thickened hose end, there must of course be sufficient space, that is to say, a recess, behind the end of the sleeve, and such recess may, for instance, be produced by turning a groove round the pipe end.

In case of non-elastic material, for instance a pipe of soft metal, being used, in the place of the hose, it would not be possible to carry out the invention. For, even though at first, a thickening of the soft metal pipe should take place behind the end of the sleeve, the result would—in case of heightened pressure, and in consequence of the absence of elasticity—be either the tearing off at the point where the thickened part adjoins the extended portion, or else the stretching of the thickened portion. In any case, the thickening would not prevent the receding of the end of the soft metal pipe into the space between the outer surface of the cone-shaped pipe end and the inner surface of the sleeve. If, on the other hand, when using an elastic hose, it were attempted to produce the thickening of the hose end, not by the longitudinal displacement of a sleeve, but by the turning of the latter, this would produce an irregular stretching and dragging of the hose end, whereby the resistance of the hose would be weakened, so that, in case of the pressure being increased, it would more easily tear at the dragged places, than a hose pressed tightly by means of the longitudinal displacement of a sleeve.

In the following description, the invention is described with the aid of examples shown in the accompanying drawings.

Over the cone-shaped part $g$ (see Figures 1 and 2) of the pipe end $a$, the end $c$ of the elastic hose is pushed so far, that the hose enters the chamfer of groove $k$. Thereupon a sleeve $l$ possessing an inner surface of correspondingly cone-shaped form, is pushed over the hose end. This sleeve, in the case shown in Figs. 1 and 2,—where Fig. 2 represents a section at X—X of Fig. 1—, consists of two separate parts $l$ and $n$, of which the inner part, $l$, possesses the cone-shaped inner surface, whereas the outer part $n$ of the sleeve, which is at one part provided with a female screw thread, is turned in at right angles at its upper end, at $o$. The surface thereby created—when the part $n$ is screwed onto the tube end—presses upon the end face $m$ of the inner part $l$, and in this manner effects the longitudinal displacement of this inner part $l$. By means of this longitudinal displacement, that part of the hose which lies between the cone-shaped end $g$ of pipe $a$ and the cone-shaped inner surface of part $l$, is being evenly stretched, and, in consequence, thickened correspondingly at the spot lying behind the sleeve $l$, that is to say, at the part lying within the groove $k$. By this, the hose end is prevented from receding into the space between the outer surface of the pipe end $g$ and the inner surface of sleeve $l$ in case of an increase of pressure, and hence the hose is secured against being pulled off.

It will be observed by reference to the drawings that the annular recess or groove $k$ presents an inclined surface over which the end of the hose is forced by the movements of the compressing member $l$, and that the depth and breadth of the said annular recess is such that the same becomes only partially filled by said thickened and heaped-up end of the hose and the said end is preserved from injury.

In the case of the mode of carrying out the invention represented in Figs. 3 to 5, the sleeve pushed over the hose, and having a cone-shaped inner surface $h$, consists of one piece only, and the fastening of this sleeve to the pipe end $a$, in the case of Fig. 3$^A$ and Figs. 4 is effected by means of a "bayonet joint" fastening, and in the case of Fig. 3$^B$ and Fig. 5, by the spring action of the slit sleeve, and the placing of the bulge $e$ in the correspondingly shaped groove $f$ of the pipe end $a$. In this connection, Fig. 4 represents an elevation of the coupling shown in section at A of Fig. 3; and Fig. 5 is an elevation of the coupling shown in section at B, of Fig. 3.

In the case of the mode of carrying out the invention shown in Fig. 6, the pipe end $a$ is provided with a coarse screw-thread, which at two places diametrically opposite each other, is planed off, so that at those places, sunk grooves $p$ are formed. The mantle sleeve $n'$, which acts upon the inner cone-shaped part $l$ of the sleeve, is at the places $q$ (which are opposite each other) at its after end, thickened inward or bent down similarly to a flange, and at those thickened or flange-like parts is provided with a corresponding female screw-thread. When the hose is fastened on the cone-shaped end $g$ of the pipe $a$, the sleeve $n'$—after the part $l$ has been pushed on—is pushed over the pipe end in such a manner that the thickened parts $q$ slide along in the sunk grooves $p$. Thereupon, as soon as the sleeve $n'$ has been pushed as far as possible over the pipe end, and the hose end has been sufficiently thickened at $k$ by the simultaneous longitudinal displacement of part $l$, a simple turn of sleeve $n'$ engages the female screw-thread on the thickened parts $q$ with the male screw-thread of the pipe end $a$, and by this, the sleeve is secured in its position.

In the case of the mode of carrying out the invention shown in Fig. 7, the screw-thread is replaced by one single "rising worm," in such a manner that on the pipe end $a$, a ring $r$ is arranged, which is interrupted at two places $p'$ lying opposite each other, the two halves of which ring on their after-side, $s$, rise from the cut away places toward the middle. The sleeve $h'$, which in this case consists of one part only, on its after part is bent inward like a flange at two places lying opposite to each other, so that at those places projections $t$ are formed, which—after the sleeve $h'$ has been pushed over the hose end—enter through the passages $p'$. and then, upon the sleeve $h'$ being turned, are able to catch behind the rising faces $s$ of the half rings $r$.

In the cases of the modes of carrying out the invention as above described, the pressing of the hose tightly on the pipe end is effected by means of direct wedge action. This pressing of the hose on the pipe end may however also be effected by means of indirect wedge action, in which case, one or more levers, a bent piece of wire, a snap spring, or some other means may suitably be inserted as an intermediate member between the outside sleeve, or the ring, and the pipe end. Those intermediate members then have the effect of the wedge action—by means of which the hose is pressed firmly on the pipe end—being produced in an indirect manner. A form of carrying this out, serving as an example of such an arrangement, is represented in Figs. 8 and 9, which are a side view and plan, respectively. In this case, there is jointed onto the sleeve $h^{11}$ a fork $u$, which terminates in an arm $v$.

On the pipe end, pins $w$ of a cylindrical or semicylindrical form, are arranged at two points opposite each other. Correspondingly formed steps $x$ on the fork $u$ are adapted to catch behind these pins $w$, after the sleeve $h^{11}$ has been pushed sufficiently far over the hose end and the pipe end. The engagement is then effected simply by depressing the fork $u$, with the steps $x$, by pressure upon the arm $v$.

The form of construction described may be modified in such a way that the fork $u$ and the arm $v$ are replaced by two arms, which act at opposite sides of the sleeve $h^{11}$. The pins $w$ may be replaced by a ring encircling the pipe end, that side of the ring which is turned toward the projections $x$ is shaped accordingly. In those cases, where the leverage required is not great, the pressure may be effected partly by hand by pushing the sleeve $h^{11}$ along, and the lever and the like may then be replaced by a loose catch or the like, which is attached to the sleeve $h^{11}$, and is pushed over the pin, ring, or the like, of the pipe end $a$, or inserted in a groove of the pipe end. The lever may be stretched over a snap spring, or a snap spring may be employed as an intermediate member between the sleeve $h^{11}$ and the lever. Instead of attaching the fork $u$ with the handle $v$, and the projections $x$, to the sleeve $h^{11}$, it may, in the reverse manner, be attached to the pipe end $a$. It is plain it is unnecessary to describe and represent all possible forms of carrying out the invention, as regards the various known means, by which the indirect wedge action may be produced. The constructions mentioned, however, will clearly show that it is possible to attain, also by indirect wedge action, simultaneously, an attachment, a joint that is resistant to pressure and firm, and a saving of wear and tear to the material of the hose.

All the modes of carrying out the invention last described are examples of a suitable rapid fastening effected by means of wedge pressure. For instance, in the case of cooking gas, fire brigade water main, and other hose pipes, where frequent changes or quick fastenings are requisite, the form of carrying out according to Fig. 1 is most suitable, especially for reliable attachments and fastenings of hose pipes which have to stand a considerable internal pressure.

By some of the hitherto known modes of attachment for attaching hose pipes to pipe ends, it has not been possible to push the hose closely enough onto the pipe end, so that a reliable attachment was not guaranteed, even when an india-rubber ring or the like was pushed over the place of attachment. The points of attachment present an absence of tight closing, which, especially in the case of joining gas pipes, may have very detrimental effects, seeing that, by the escaping gas, explosions of gas and fires may be caused. In the case of some other hitherto known modes of attachment, the winding round of wire has been employed. Apart from the fact that such wire windings take up much time for their application, and destroy the ends of the hose pipes, they also possess the disadvantage, that they cannot be made by everybody, and they render it very difficult to detach the hose again from the pipe end. Even in cases where a screw joint is employed for attaching the hose to the pipe end, it is necessary to wind wire round, and only then has it been possible to insert, between the nut of the screw joint and the pipe end, the packing for tightly closing the place of joining. It is self-evident that such packings will not keep tight permanently; in the course of time they are very much worn, and rendered useless, by the repeated turning of the nut of the screw joint. All these defects are remedied by means of the modes of attaching, and the attachment appliances, described. The attachment can be effected by anybody with ease and rapidity. The material of the hose is affected as little as possible, the tight closing becomes reliable, and the attachment becomes such, that, as has been shown by repeated experiments, the hose itself will break before the hose end will come away from the pipe end. It is, moreover, important that the attachment appliances should be of very simple construction, and applicable for all purposes. The constructions may be manufactured in a simple and cheap manner, as the components of the appliances may be produced by machinery in large quantities, and kept in stock of standard sizes for the current diameters of hose and pipes.

Having thus particularly described this my invention, I declare that what I claim and desire to secure by United States Letters Patent is:

1. In a hose coupling, the combination of a member having a conical end, a hose on the conical end of said member, a member having a tapered bore through which the hose end extends, said member movable longitudinally to compress the hose between said sleeve and the conical end of said first-mentioned member, said first-mentioned member having an annular recess at the base of said conical portion presenting an inclined surface over which the end of the hose is forced and becomes thickened and heaped up, the depth and breadth of the said annular recess being such that the same becomes only partially filled by said thickened and heaped-up end of the hose and the latter is preserved from injury.

2. In a hose coupling the combination of a member having a conical end of reduced diameter, an annular recess at the base of said conical end, and external screw threads in rear of said recess, a hose on the conical end of said member, a sleeve member having a tapered bore through which the hose end extends, and an outer sleeve member engaging the outer end of the first-mentioned sleeve member and having its inner end internally screw-threaded to engage the first-mentioned member and move the first-mentioned sleeve member inwardly on the hose and force the end of the hose into, and cause the same to become thickened and heaped-up in, the said annular recess, the width and depth of such recess being such that the same becomes only partially filled with said heaped-up end of the hose and said end of the hose is preserved from coming in contact with and being injured by the screw threads.

3. In a hose coupling, the combination of a member having a conical end of reduced diameter, an annular recess at the base of said conical end, external screw threads in rear of said recess and longitudinal passages intersecting said screw threads, a hose on the conical end of said member, an inner sleeve member having a tapered bore through which the hose end extends, and an outer sleeve member engaging the outer end of the inner sleeve member and having its inner end internally screw-threaded to engage the conical ended member and provided with longitudinal passages intersecting said screw threads, for the purpose set forth, said first-mentioned member and said inner and outer sleeve members coacting to force the end of the hose into, and cause the same to become thickened and heaped-up in, the said annular recess, the width and depth of such recess being such that the same becomes only partially filled with said heaped-up end of the hose and said end of the hose is prevented from coming in contact with and being injured by the screw threads.

4. In a hose coupling, the combination of a member having a conical end and an annular recess at the base of said conical portion presenting an inclined surface at such base, a hose on the conical end of such member, and means to move the hose longitudinally on the conical portion of the first-mentioned member and compress the hose on such conical portion, so that the end of the hose is forced over the inclined surface of such annular recess and becomes thickened and heaped-up in such annular recess, the depth and breadth of the said annular recess being such that the same becomes only partially filled by such thickened and heaped-up end of the hose and the said end is preserved from injury.

In testimony whereof I have hereunto set my hand in presence of two subscribing witnesses.

CARL NIELSEN.

Witnesses:
 WM. ANDERSON,
 ALBERT G. MICHELSON.